United States Patent [19]

Newstead et al.

[11] 3,949,845
[45] Apr. 13, 1976

[54] THRUST TRANSMITTING ASSEMBLIES
[75] Inventors: Charles Newstead; Andrew Charles Walden Wright, both of Birmingham, England
[73] Assignee: Girling Limited, Birmingham, England
[22] Filed: July 31, 1974
[21] Appl. No.: 493,639

[30] Foreign Application Priority Data
Aug. 1, 1973 United Kingdom............... 36666/73

[52] U.S. Cl. ............................... 188/331; 188/268
[51] Int. Cl.² ........................................ F16D 51/20
[58] Field of Search ........... 188/331, 332, 333, 268, 188/325; 403/132, 133

[56] References Cited
UNITED STATES PATENTS

| | | | |
|---|---|---|---|
| 2,460,116 | 1/1949 | Bazley | 188/268 X |
| 2,918,146 | 12/1959 | Cornillaud | 188/79.5 SC X |
| 3,412,869 | 11/1968 | Wallace et al. | 188/268 X |
| 3,744,595 | 7/1973 | Adams | 188/331 |
| 3,750,853 | 8/1973 | Farr | 188/71.8 X |
| 3,763,664 | 10/1973 | Stewart | 64/26 |
| 3,805,926 | 4/1974 | Clay et al. | 188/331 |

Primary Examiner—George E. A. Halvosa
Attorney, Agent, or Firm—Scrivener Parker Scrivener and Clarke

[57] ABSTRACT

A thrust transmitting assembly, particularly useful as a shoe tip abutment for an internal shoe drum brake, has a cylindrical output member and a slidable input member in the form of a piston, the members being transmissively coupled by a fluent material, such as an elastomeric material, which transmits input thrust in one direction to the output member in the same direction but at a higher velocity.

4 Claims, 3 Drawing Figures

THRUST TRANSMITTING ASSEMBLIES

This invention relates to thrust transmitting assemblies and is applicable, among other things, to abutment assemblies for internal shoe drum brakes.

The invention resides broadly in a thrust transmitting assembly comprising a load input member slidably mounted within a load output member, and means for transmitting movement of the input member to the output member in the same direction but at a higher speed.

We have previously proposed an abutment assembly for an internal shoe drum brake, comprising a cylinder body having a stepped bore and two opposed pistons separated by a mass of resiliently deformable material (such as soft rubber) whose hydrostatic properties are used to transmit forces from one piston to the other with a given force-transmitting ratio. The pistons are fast with or abutted by tappets engaging the respective adjacent ends of the brake shoes opposite the actuated ends, so that, in forward braking, the trailing end of the leading shoe forces the larger piston into the cylinder bore to displace the deformable material, which acts as a liquid over the smaller area of the second piston to produce a reduced output thrust on the leading end of the trailing shoe. There is thus obtained a duo-servo braking action in which the abutment assembly acts to reduce the servo-input force on the trailing shoe. The ratio is usually in the region of 2:1 or 3:1, being designed to equalise or substantially equalise the braking effort of the two shoes.

In its application to an abutment assembly of this general character, the invention shows the tendency for the larger piston to jam in the cylinder body to be reduced. Also, there is less bodily displacement of the deformable material, whose life thereby tends to be increased.

The invention will now be described in one of its possible constructional forms, by way of example, with reference to the accompanying drawings, in which.

Figure 1:
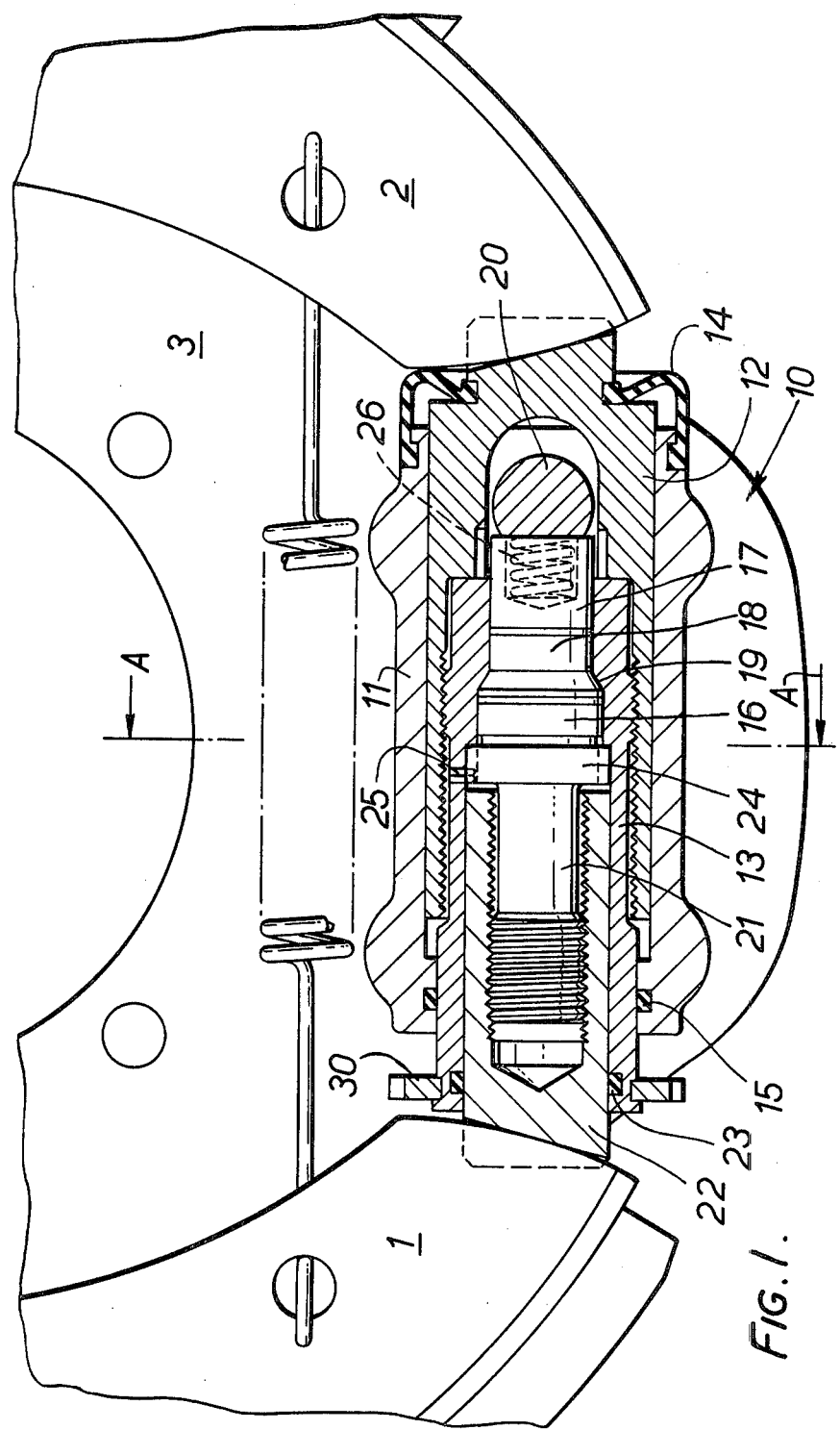
FIG. 1 is a sectional elevation of an assembly in accordance with the invention forming an abutment assembly in a duo-servo brake.

The abutment assembly 10 seen in FIG. 1 forms part of an internal shoe drum brake of the duo-servo type having a primary shoe 1 and a secondary shoe 2 with a degree of circumferential float around a backplate 3. At their other ends, the shoes are actuated by a double ended wheel cylinder (not shown) in known manner.

The assembly 10 comprises a housing 11, secured to the backplate 3 in which are slidably received and guided an output tappet 12 and a sleeve member 13 which is screw threaded into the tappet 12. The outer end of tappet 12 is sealed to the housing 11 by a flexible sealing boot 14, and the plain outer portion of sleeve member 13 extends through an annular seal 15 at the opposite end of the housing.

The sleeve member 13 is machined internally to form a cylinder having a stepped bore in which are received the head 16 of an input piston, an earthing piston 17 and a mass of resiliently deformable material 18, for example of soft natural or synthetic rubber, this mass 18 extending from the larger bore, across a transitional sloping shoulder 19 into the smaller bore.

The earthing piston 17 normally bears against a rigidly fixed transverse pin or abutment 20 firmly anchored to the backplate 3, while the piston 16 has a threaded shank 21 threaded into an input tappet 22 which is slidably received in the left hand part of sleeve member 13 and sealed to it by an annular seal 23. The piston 16 also has an enlarged head 24 which abuts a shoulder on the interior of sleeve member 13 and is keyed against rotation relation to the sleeve member by pins 25.

Preferably, and as shown, the earthing piston houses a compression spring 26 abutting the abutment 20, to ensure that the piston 17 maintains contact with the mass of deformable material 18 during reverse braking, as described below.

In operation, during forward braking, the leading shoe 1 bears on tappet 22 to force the piston 16, sleeve member 13 and output tappet 12 to the right as seen in FIG. 1, against the end of the trailing shoe 2. Once any clearances have been taken up the deformable mass 18, being restrained by earthing piston 17, transmits its thrust to the sloping shoulder 19 of the cylinder bore, thereby applying to the sleeve member 13 a reduced thrust and a corresponding increased velocity compared with the piston 16. The increased velocity of the sleeve member 13 relative to the piston 16 and tappet 22 reduces the tendency of these components to jam in the sleeve.

It will be understood that the mechanical advantage and velocity ratio of the transmission correspond with the ratio of the area of piston 16 to the area of the shoulder 19, which is conveniently in the region of 3:1, subject of course to frictional losses and any elastic reduction in volume of the deformable mass 18. When the braking effort is released, the shoes, motivated by the return springs, press the parts back to their illustrated positions.

In reverse braking, the effort applied by the trailing shoe 2 is transmitted directly to the leading shoe by the tappet 12 acting through the sleeve member 13, in turn acting at its shoulder on the enlarged head 24, through the threaded shank 21 to the input sleeve 13.

Figure 2:
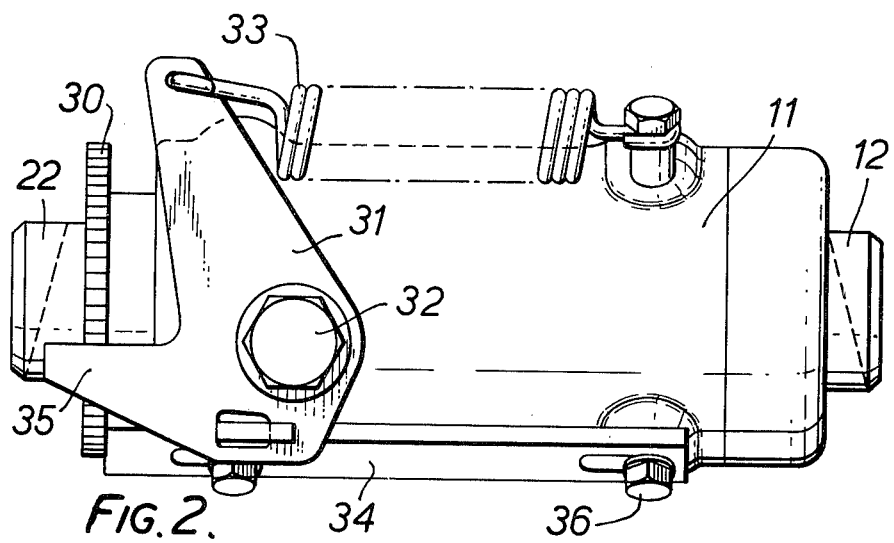
FIG. 2 is a side view of the assembly seen in FIG. 1.
Figure 3:
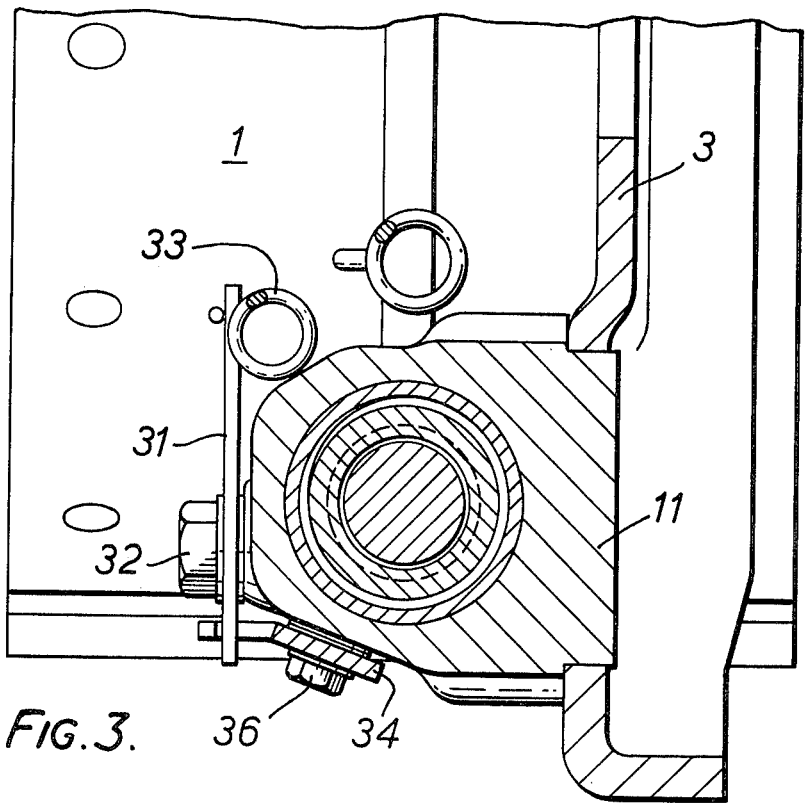
FIG. 3 is a transverse section, taken on the line AA of FIG. 1.

In order to cater for automatic adjustment for lining wear compensation, the sleeve 13 has secured to it a ratchet wheel 30, operable by a bell crank lever 31 pivotally mounted at 32 on the housing 11. One arm of the lever is engaged by a coil compression spring 33 anchored to the housing 11, and near its elbow, the lever is coupled to a sliding link 34, which is slidably mounted on the housing 11, for movement parallel with the axis of adjustment. As seen in FIG. 2, the left hand end of the link 34 abuts the adjacent side face of the ratchet wheel 30 which, by virtue of its connection to sleeve member 13 moves to the right upon brake actuation a distance proportional to movement of the trailing shoe 2.

Thus, during brake application, the link 34 is pushed to the right to rotate lever 31 anti-clockwise, against the action of spring 33. The free arm 35 of the lever acts as a pawl, which is stroked over the ratchet teeth and, if the total displacement is sufficiently large to indicate that adjustment is required, picks up a new tooth. Upon brake release, the spring 33 returns the lever in the clockwise direction, so that the arm 35 rotates the ratchet wheel and the sleeve member 13. This angular movement is transmitted by the keying pins 25 to the piston, which is thereby rotated relative to the input tappet to effect axial adjustment between the tappet and the piston in a sense to lengthen the thrust transmitting assembly. The correct datum position for return movement of the link is defined by an adjustable stop 36. This provides a particularly convenient and simple means of setting the adjuster on initial assembly and re-setting on subsequent re-assembly during servicing.

Although the adjuster is responsive to movement of the trailing shoe, the adjustment is transmitted to both shoes equally, by virtue of the fact that the force transmitting parts of the assembly are free to move axially relative to the housing 11.

Manual resetting is effected by inserting one tool through a back plate hole to disengage the pawl arm 35 from the ratchet wheel 30, and inserting a second tool to engage the periphery of the ratchet wheel and thereby rotate it.

The ratchet wheel and link 34 may be spring urged together, so that when the unit is installed in an attitude other than horizontal, its internal components will be prevented from falling under gravity to urge the adjacent shoe against the drum.

In the illustrated example, it is important for the link to respond to movement of the secondary shoe. This is because some unevenness of shoe wear can occur as between the shoes and if primary shoe movement were to control movement of the link, then should the primary shoe wear faster than the secondary, it would then be possible for the secondary shoe to be against the drum at the moment of brake actuation. With the adjuster sleeve 13 up against the shoulder of the right hand tappet, no force reduction would occur in the mass 18 and a full duo-servo effect would then be transmitted to the secondary shoe, resulting in excess braking at the wheel in question.

The adjuster could, of course, be employed in other ways. For example, it could be mounted on a hydraulic slave cylinder at the "actuated" ends of the brake shoes, simply by arranging for the tappet (or other movable element sensitive to shoe movement) to pull the sliding link rather than pushing it.

It should also be noted that the mass of elastomeric material 18 could be replaced by a mass of other fluent material.

We claim:

1. A thrust transmitting assembly for transmitting the thrust of an input element to an output element comprising a cylinder body having operative engagement with said output element, a first piston slidably received within said cylinder body and having operative engagement with said input element, a second piston disposed in said cylinder body and having a frontal area smaller than that of said first piston and in direct communication therewith, a mass of fluent elastomeric material disposed between said pistons in thrust transmitting relationship with both said pistons, a shoulder in said cylinder body defined by the respective diameters of said first and second pistons, and abutment means fixed relative to the cylinder body and engaging said second piston to limit movement thereof, a portion of thrust on said first piston when moved in one direction by said input element being transmitted through said fluent material to said shoulder to move said cylinder body and hence said output element in said one direction but at a higher speed than said first piston is moved by said input element.

2. An assembly as claimed in claim 1 in combination with an internal-shoe, vehicle drum brake comprising a back plate structure and a pair of opposed arcuate brake shoes mounted on said back plate structure for limited circumferential movement relative thereto, said assembly being interposed between adjacent respective tips of said brake shoes and operative to transmit thrust from one said shoe to the other.

3. An assembly as claimed in claim 2, further comprising a housing fast with said back plate structure, said output member being slidably mounted in said housing, and wherein said fixed abutment means is stationary with respect to said housing and back plate structure.

4. An assembly as claimed in clain 3, further including spring means acting between said fixed abutment means and said second piston to maintain said second piston in compressive engagement with said mass of fluent material.

* * * * *